United States Patent [19]
Uerlichs et al.

[11] 3,830,251
[45] Aug. 20, 1974

[54] HOT BLAST VALVE

[75] Inventors: Johannes Uerlichs, Woffelsbach;
Rudolf Muller, Merzenich; Willi Kuckertz, Konzendorf, all of Germany

[73] Assignee: Hermann Rappold & Co., GmbH, Birkesdorf, Germany

[22] Filed: Sept. 8, 1972

[21] Appl. No.: 287,544

[30] Foreign Application Priority Data
Sept. 8, 1971   Germany............................ 2144893

[52] U.S. Cl................................. 137/340, 29/157.3
[51] Int. Cl............................................. F16k 49/00
[58] Field of Search ............ 137/340; 251/328, 367; 29/475, 477, 477.3, 463, 157.3; 165/169, 155

[56] References Cited
UNITED STATES PATENTS

| | | | |
|---|---|---|---|
| 3,202,171 | 8/1965 | Rappold et al. ..................... | 137/340 |
| 3,266,517 | 8/1966 | Carr.................................... | 137/340 |
| 3,292,654 | 12/1966 | Rappold et al. ..................... | 137/340 |
| 3,499,462 | 3/1970 | Berczynski......................... | 137/340 |
| 3,552,423 | 1/1971 | Vietorisz............................ | 137/340 |
| 3,557,823 | 1/1971 | Carr et al........................... | 137/340 |

*Primary Examiner*—Henry T. Klinksiek
*Attorney, Agent, or Firm*—Wenderoth, Lind & Ponack

[57] ABSTRACT

A hot-blast valve has a valve casing of welded steel elements and having sealing surfaces to engage a slide valve. The casing also has therein cooling ducts to cool in particular the sealing surfaces. The slide valve is formed of trough-shaped steel elements spirally coiled to form a disc.

3 Claims, 2 Drawing Figures

PATENTED AUG 20 1974  3,830,251

HOT BLAST VALVE

BACKGROUND OF THE INVENTION

The invention relates to a hot-blast valve comprising a valve casing constructed as welded steel fabrication and having cooling medium ducts for cooling, in particular, of the sealing surfaces of the valve slide and further comprising a valve slide which consists of trough-shaped steel sections coiled into a spiral shape to form a disc and being welded to each other at the contact positions thereof and having a circumferential ring projecting beyond the end faces of the disc and having connections for the supply and discharge of the coolant.

Hot-blast valves are well known. In the interior of the valve housings are cooling medium ducts for conducting a coolant in order to cool the casing and in particular the sealing surfaces of the valve slide. There are numerous proposals for the production of the valve casing. Previously the valve casing was made of cast steel with a copper ring welded therein but subsequently it became the practice to produce the ring or rings disposed around the valve slide from a preformed steel ring by chip-forming machining, a procedure which called for substantial expense in terms of tools and personnel. The prior art also discloses a more recent proposal of the applicant according to which, and by contrast to conventional design principles, the valve casing in its entirety is produced as a welded steel fabrication, the individual parts of the valve casing being prefabricated or preformed from steel and being joined to each other by welding seams. Due to the progressively increasing diameters of hotblast valves and the progressively increasing pressures and temperatures with the resultant alternating temperature stresses, it follows that the design and construction of the valve casing requires great care and experience if the welded fabrication is to have a long working life. On the one hand, the number of welding seams is to be minimised and their position is to be an optimum for performing reliable welding. However on the other hand, it is desirable for the expense of prefabrication of the individual parts of the casing to be confined to an economically tolerable level. In these circumstances the position of the welding seams will of course also play an important part with regard to the alternating pressure and temperature stresses.

Although it has been well known in the production of valve slides to construct the latter in the form of a disc of spirally coiled tubes welded to each other, the applicant proposes the application of troughshaped rolled section spirals, in particular of H-shaped rolled section spirals for the production of the valve slide so that a substantially greater stiffness thereof is achieved, in particular for valve slides of large diameter so that it is also possible for very high pressures to be applied.

Finally, it is also well known that steel, including high tensile steel, may be shaped into sections by the extrusion method.

SUMMARY OF THE INVENTION

The object of the invention is to simplify the production of hot-blast valves and at the same time to achieve an improvement in the quality and working life of hot-blast valves.

To solve the problem the invention proposes for a hot-blast valve of the kind mentioned heretofore that the parts of the welded steel fabrication of the valve casing and/or the trough-shaped steel sections and/or the circumferential ring of the valve slide comprise extrusion sections.

The invention is based on the knowledge that the use of extruded steel sections enables the design and manufacturing costs in the production of hot-blast valves to be substantially reduced and the working life of the hot-blast valves is at the same time improved. An essential advantage inter alia is due to the fact that the sources of error in the previously used method of producing the individual elements of the hot-blast valves are avoided and the position of the welding seams and accordingly their flawless quality is improved by appropriate shaping of the cross-section of the extruded sections. Compared with conventional welded steel fabrications this achieves a substantial reduction in the number of welding seams over the cross section and therefore not only leads to a reduction of manufacturing costs but also of the risks which necessarily arise in the production of welding seams.

The invention enables the welded fabrication of the valve casing to be produced from extruded sections which are symmetrical relative to the transverse median plane of the valve so that the total number of required sections is very small.

In constructing the cross-sectional shape of the extruded sections the edges thereof which are to be joined by welding seams are provided with fillet zones.

Further functions, features and advantages of the invention are disclosed in the description hereinbelow of an embodiment which refers to the accompanying drawings in which FIG. 1 is a cross-section through a valve casing and FIG. 2 is a cross-section through a valve slide.

DETAILED DESCRIPTION OF THE INVENTION

Figure 1:
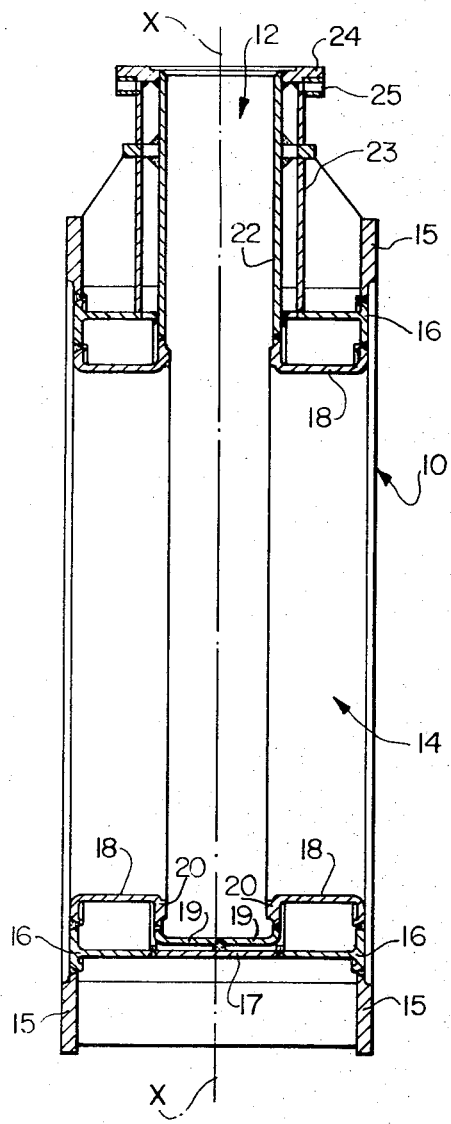
Figure 2:
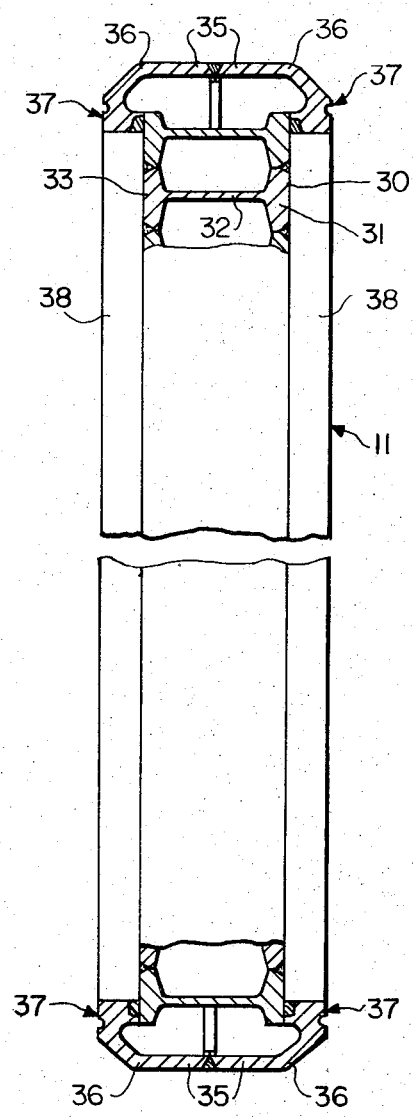

The hot-blast valve comprises the valve casing (FIG. 1) generally referred to by the numeral 10 and having formed therein a valve slide shaft 12 for accommodating the valve slide 11 (FIG. 2). The aperture 14 of the valve casing may be closed with the valve slide 11.

The valve casing 10 is symmetrical relative to its transverse median plane X—X, identical extruded sections being disposed on both sides of the aforementioned transverse median plane and accordingly only a very small number of different extruded sections is required for producing the valve casing. On both sides of the transverse median plane the valve casing 10 is provided with a flange ring 15 for the connection of the hot-blast pipe, an approximately T-shaped extruded section 16, an approximately U-shaped extruded section 18 and an angle section 19. The seal surfaces 20, against which the valve slide bears, are formed on the extruded section 18. A ring 17 joins the webs of the T-shaped extruded sections 16. In the upper part of the valve casing the valve slide shaft 12 is defined by plates 22, 23 with the cooling duct formed therebetween. The coolant duct which cools the casing and in particular the seal surfaces 20 is formed between the extruded sections 16, 18, 19 and the ring 17. The coolant discharge 25 is disposed below a headpiece 24. The coolant inlet is disposed on the underside of the valve casing and is not shown.

The expert will readily realise that on the one hand the production of a valve casing of this kind provides substantial simplifications in terms of production costs and on the other hand permits the production of a valve casing 10 which not only has a narrower width but also a substantially smaller number of welding seams than known valve casings produced as welded fabrications.

The valve slide 11 illustrated in FIG. 2 comprises a disc consisting of spirally coiled H-shaped extruded sections 30. The edges of the flanges 31, 33 of sections 30 are welded to each other so as to produce coolant ducts which extend between the webs 32 spirally towards the slide middle and return therefrom. A core member is appropriately provided in the middle of the slide. A circumferential ring 35 comprising two extruded sections 36 and forming seal surfaces 36 which project in front of the planes of the disc and cooperate with the seal surfaces 20 of the valve casing 10 are disposed around the disc formed in the manner described hereinabove. Disc-shaped recesses 38 which may be filled with refractory material are thus produced on both sides of the valve slide 11.

The extruded sections 36 for forming the circumferential ring 35 and the extruded sections 19 of the valve casing 10 are appropriately produced with overlong angle members to enable such members to be cut off in accordance with the required thickness of the valve slide 11 and the required width of the valve slide shaft 12. It is therefore not necessary to produce separate extruded sections 19, 36 for hot-blast valves of different size.

We claim:

1. Hot-blast valve comprising a valve slide formed of trough-shaped steel sections having flanges and webs and being coiled into a spiral shape to form a disc and being welded to each other at the areas of contact between adjacent flanges thereof to form opposite flat surfaces of said valve slide, and thereby forming cooling ducts between adjacent webs thereof, a circumferential ring projecting beyond the periphery of said disc, said ring having integral sealing surfaces and having connections for the supply and discharge of a coolant; and an integral valve casing formed from welded steel elements and having integral sealing surfaces to be engaged with said sealing surfaces of said valve slide and having cooling ducts therein for cooling said sealing surfaces; said trough-shaped steel sections, said circumferential ring and said welded steel elements comprising extruded sections.

2. Hot-blast valve according to claim 1, wherein said extruded sections of said valve casing are symmetrical relative to the transverse median plane of said valve.

3. Hot-blast valve according to claim 1, wherein welding fillet zones are formed on the extruded section edges which are to be connected by means of welding seams.

* * * * *